L. U. STENGER AND R. SUMMERFIELD.
DEMOUNTABLE RIM.
APPLICATION FILED MAY 22, 1919.
1,378,494. Patented, May 17, 1921.
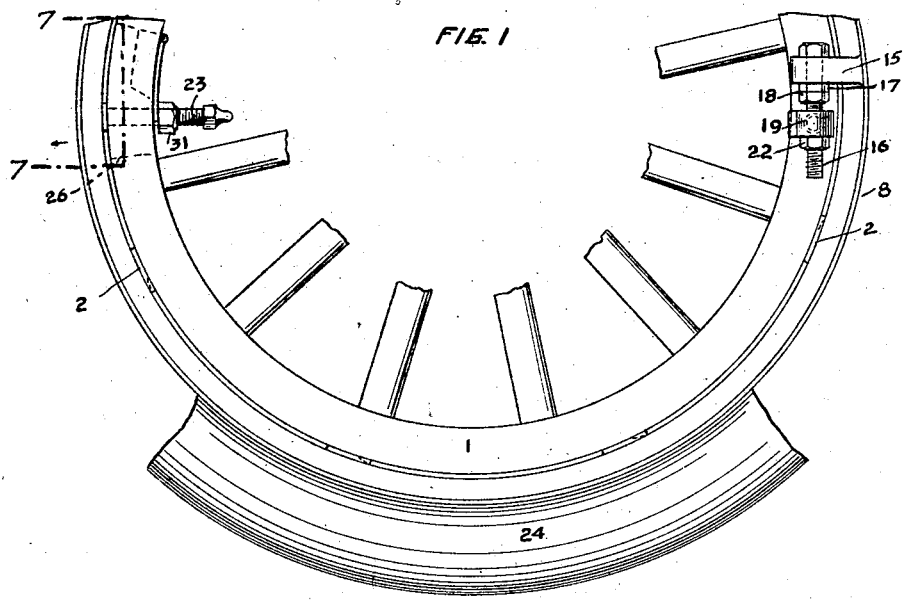
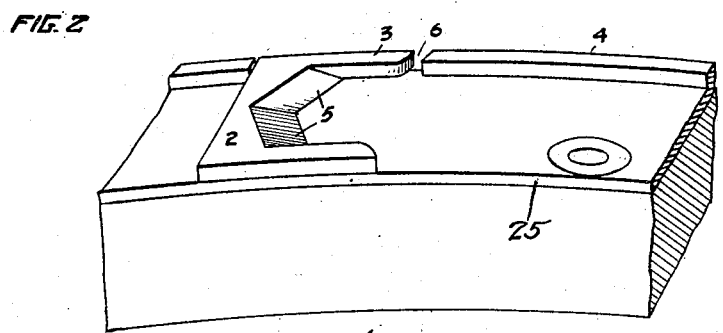
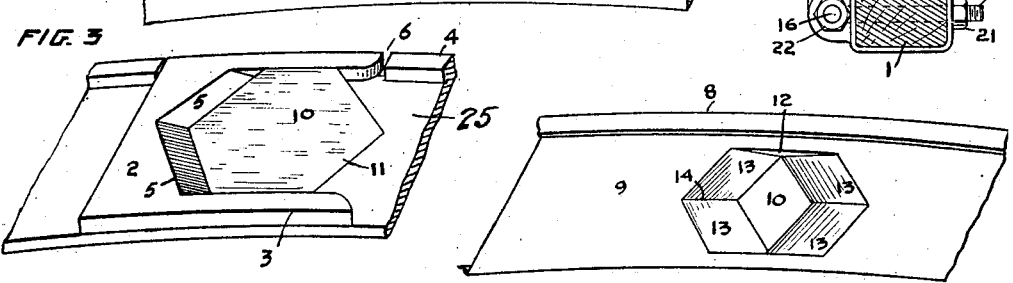
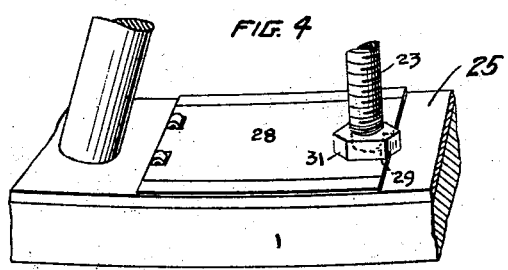
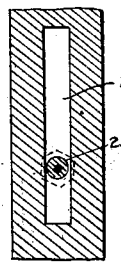
INVENTORS
L. U. STENGER
R. SUMMERFIELD
ATT'Y.

UNITED STATES PATENT OFFICE.

LEONARD U. STENGER AND RALPH SUMMERFIELD, OF ALAMEDA, CALIFORNIA.

DEMOUNTABLE RIM.

1,378,494.  Specification of Letters Patent.  Patented May 17, 1921.

Application filed May 22, 1919. Serial No. 298,863.

*To all whom it may concern:*

Be it known that we, LEONARD U. STENGER and RALPH SUMMERFIELD, citizens of the United States, and residents of Alameda, in the county of Alameda and State of California, have invented new and useful Improvements in Demountable Rims, of which the following is a specification.

The present invention relates to demountable rims, the object of the invention being to provide a rim which can be quickly and securely attached to the felly of a wheel and quickly removed therefrom, which will be cheap and simple, which will involve no change in the size or form or balance of the wheels, in which the rim can be changed without changing the locking devices therefor, which will take up the natural wear and will avoid squeaking and other noises so common in the rims at present in general use, which will insure alinement of the tire, in which the traction of the automobile will tend to secure the rim on the felly band, and which can be installed on any ordinary felly band of an automobile wheel already in operation.

In the accompanying drawing, Figure 1 is a side view of a portion of a wheel equipped with our invention, a portion of the pneumatic tire being installed thereon; Fig. 2 is a broken perspective view on a large scale of a portion of the felly of the wheel, viewed from the outer side thereof; Fig. 3 is a similar view of another portion of the felly band, viewed from the outer side thereof, showing a locking means detached from the rim; Fig. 4 is a similar view illustrating means for staying a valve stem; Fig. 5 is a transverse section of the felly and demountable rim thereon; Fig. 6 is a perspective view of a portion of the demountable rim, viewed from the inner side; Fig. 7 is a sectional view on the line 7—7 of Fig. 1.

Referring to the drawing, 1 indicates the felly of a wheel and 25 the felly band thereon. To the outer surface of said felly band are secured at equal intervals, a number, say from five to eight, of metal guide ways 2 having side guides 3 registering with the edges of the felly band, a wall or shoulder 4 on an edge of said felly band being cut away, as shown at 6, to permit the guide ways to be inserted thereon, so that the edges of said guide-ways are in line with said wall. The inner edge 7 of the cross member of the guide-way 2 connecting two side guides 3 has two surfaces 5 oblique to the surface of the felly band, and meeting at the center of the guide at an obtuse angle.

8 indicates a demountable rim which has secured to its inner surface 9' by brazing or in any other suitable manner, a number, corresponding in number to the guide ways 2 on the felly band, of wedges 10. In Fig. 3, one of these wedges 10 is shown detached from the rim and almost in operative engagement with the guide-ways 2 on the felly band. Each wedge is formed with a long convex surface 11 which is attached, as already stated, by brazing or otherwise, to the inner concave surface 9 of the rim 8, side surfaces 12 in planes parallel with the plane of the wheel, and at each end two oblique plane surfaces 13 meeting at the center in a straight line 14, making an acute angle with the inner surface 9 of the rim 8 and said terminal surfaces making with each other the same obtuse angle which the surfaces 5 of the guide-way made with each other. It results from this construction that if the rim be placed upon the felly band, so that the wedges are in circumferential registry with the guide-ways and a relative rotary movement in the proper direction is given to the felly and rim, the front oblique surfaces 12 will engage the oblique surfaces 5 and will fit tightly thereagainst, and any further rotary movement in the same direction of the rim upon the felly will only tend to wedge the wedges still more tightly in the guide-ways. The parts are so arranged that such a rotary movement is produced by the forward movement of the automobile, thereby, by traction with the surface of the ground, producing a movement of the felly relative to the rim tending to wedge the wedges in the guideways.

The reason for providing oblique wedging surfaces 13 at both ends of the wedges is to render the rim adapted for use on either side of the machine, for it will be evident, upon consideration of other parts of the device hereinafter described, that, to transfer the rim from the right hand side of the machine for instance to the left, it must, before being applied to the wheel, be turned half way around about a vertical axis through its center, and, therefore, it is necessary to provide wedging surfaces at both ends of the wedges.

For drawing the wedging surfaces of the wedges 13, tightly against those 5 of the guideways, there is provided a transverse extension 15 from the rim extending over the side of the felly, as clearly shown in Figs. 1 and 6, and through a hole in the free end of said extension 15 is passed a tightening bolt 16, on which are screwed a lock nut 17 and a back-off nut 18. Said bolt 16 passes through a hole in the head of a bolt 19, which extends transversely through a hole in the felly, and is screwed therein by a nut 21. A nut 22 on the bolt 16, by pressure against the head of the bolt 19, when screwed up, serves to draw the extension 14 toward the bolt 19, and thus serves to move the rim about the felly into proper locking position.

To permit of the insertion of the valve stem 23 required for inflating the pneumatic tire 24, the felly is formed with a circumferentially extending slot 26, of just sufficient width to permit the valve stem 23 to extend therethrough. Said valve stem 23 as is the usual practice, is inserted in the slot 26, pressure with the hands pushing the rim to the opposite side of the felly. The top of the rim is then pushed backward. A hinged valve stem stay or cover 28 for the slot 26 is then closed down on the inner side of the felly band, having a forked outer end 29, which straddles the valve stem 23 and the valve stem nut 31 is then screwed outward, retaining the valve stem stay 28 closed.

The valve stem nut 31, when screwed tightly down upon the stay 28, acts as a clamp to securely retain the valve stem in the position in which it has been placed, since the valve stem is now clamped between said nut and the small nut, which is interposed between the felly and the rim of the wheel, according to the present practice.

We claim:—

1. In combination, a wheel, a felly band, a demountable rim loosely embracing the band to allow of circumferential movement thereon, coacting means secured to the confronting faces of the band for causing the latter to tightly embrace the former when it is partially rotated, said means comprising spaced guideways having oblique surfaces and spaced guide openings each of which is formed with a plurality of oblique surfaces, means for locking the rim in tightened position, the felly of said wheel being formed with a circumferentially extending slot to slidably receive a valve stem, a cover plate hinged to the inner periphery of the felly and adapted to span said slot, said plate being formed to straddle the valve stem, and a nut on the valve stem adapted to engage said plate.

2. In combination, a wheel, a felly band, a demountable rim loosely embracing the band to allow of circumferential movement thereon, coacting means secured to the confronting faces of the band and rim for causing the latter to tightly embrace the former when it is partially rotated, and means for locking the rim in tightened position comprising, a lateral extension on said rim apertured at its inner end, a bolt extending through the felly and having an opening in the head thereof, a second bolt extending through said aperture and opening, and nuts on the second bolt adapted to embrace said extension and the head of the first bolt.

3. A demountable rim comprising an annular band, tire engaging flanges formed thereon, and guide pieces spaced apart circumferentially about the inner surface of the band, each of said guide pieces being formed with a plurality of oblique surfaces at the opposite ends thereof for the purpose described.

4. A demountable rim comprising, an annular band, tire engaging flanges formed thereon, and guide pieces spaced apart circumferentially about the inner surfaces of the band, each of said guide pieces being formed with oblique surfaces at the opposite ends thereof, with the surfaces at one end being disposed in reverse relation to the surfaces at the other end for the purpose described.

LEONARD U. STENGER.
RALPH SUMMERFIELD.